United States Patent
Lysaght et al.

(10) Patent No.: US 7,243,312 B1
(45) Date of Patent: Jul. 10, 2007

(54) METHOD AND APPARATUS FOR POWER OPTIMIZATION DURING AN INTEGRATED CIRCUIT DESIGN PROCESS

(75) Inventors: Patrick Lysaght, Los Gatos, CA (US); Tim Tuan, San Jose, CA (US); Goran Bilski, Molndal (SE)

(73) Assignee: Xilinx, Inc., San Jose, CA (US)

( * ) Notice: Subject to any disclaimer, the term of this patent is extended or adjusted under 35 U.S.C. 154(b) by 170 days.

(21) Appl. No.: 10/693,568

(22) Filed: Oct. 24, 2003

(51) Int. Cl.
G06F 17/50 (2006.01)
(52) U.S. Cl. ............................ 716/2; 716/12; 716/13; 716/14; 716/15; 716/16
(58) Field of Classification Search .................. 716/2, 716/12–16
See application file for complete search history.

(56) References Cited

U.S. PATENT DOCUMENTS

| | | | | |
|---|---|---|---|---|
| 4,698,760 A | * | 10/1987 | Lembach et al. ............... 716/6 |
| 5,504,440 A | | 4/1996 | Sasaki |
| 5,541,849 A | * | 7/1996 | Rostoker et al. ............... 716/18 |
| 5,612,636 A | * | 3/1997 | Ko ................................ 326/83 |
| 5,654,898 A | * | 8/1997 | Roetcisoender et al. ....... 716/9 |
| 5,787,011 A | * | 7/1998 | Ko ................................. 716/2 |
| 5,808,479 A | | 9/1998 | Sasaki et al. |
| 5,811,985 A | | 9/1998 | Trimberger et al. |
| 5,815,004 A | | 9/1998 | Trimberger et al. |
| 5,880,598 A | | 3/1999 | Duong |
| 5,880,967 A | * | 3/1999 | Jyu et al. ........................ 716/6 |
| 5,892,961 A | | 4/1999 | Trimberger |
| 5,914,616 A | | 6/1999 | Bauer et al. |
| 5,984,510 A | * | 11/1999 | Guruswamy et al. ........... 716/2 |
| 6,009,248 A | * | 12/1999 | Sato et al. ....................... 716/2 |
| 6,163,168 A | | 12/2000 | Nguyen et al. |
| 6,178,542 B1 | * | 1/2001 | Dave ............................... 716/18 |
| 6,209,122 B1 | * | 3/2001 | Jyu et al. ......................... 716/6 |
| 6,269,458 B1 | * | 7/2001 | Jeter et al. ..................... 714/42 |
| 6,272,668 B1 | * | 8/2001 | Teene ............................. 716/10 |
| 6,348,813 B1 | | 2/2002 | Agrawal et al. |
| 6,362,649 B1 | | 3/2002 | McGowan |
| 6,448,808 B2 | | 9/2002 | Young et al. |
| 6,467,074 B1 | * | 10/2002 | Katsioulas et al. ............ 716/17 |
| 6,505,322 B2 | * | 1/2003 | Yamashita et al. .............. 716/1 |

(Continued)

OTHER PUBLICATIONS

U.S. Appl. No. 10/378,735, filed Mar. 3, 2003, New.

*Primary Examiner*—Vuthe Siek
*Assistant Examiner*—Naum Levin
(74) *Attorney, Agent, or Firm*—Robert Brush

(57) ABSTRACT

Method and apparatus for designing an integrated circuit is described. In an example, the integrated circuit is designed in accordance with timing constraint data. Any logic paths in the plurality of logic paths that have a timing characteristic within a threshold are identified and define a first set of logic paths. Any logic paths in the plurality of logic paths other than those in the first set of logic paths define a second set of logic paths. The integrated circuit is then selectively optimized to reduce power consumption in response to the first set of logic paths and the second set of logic paths. In another example, the integrated circuit is first designed in accordance with timing constraint data. Timing critical logic circuitry is then identified. The integrated circuit is then selectively optimized in response to the timing critical circuitry.

18 Claims, 5 Drawing Sheets

U.S. PATENT DOCUMENTS

| | | | |
|---|---|---|---|
| 6,539,536 B1 * | 3/2003 | Singh et al. | 716/18 |
| 6,583,645 B1 | 6/2003 | Bennett et al. | |
| 6,590,419 B1 | 7/2003 | Betz et al. | |
| 6,621,325 B2 | 9/2003 | Hart et al. | |
| 6,643,840 B2 * | 11/2003 | Kumagai | 716/19 |
| 6,687,888 B2 * | 2/2004 | Chen | 716/5 |
| 6,721,924 B2 * | 4/2004 | Patra et al. | 716/2 |
| 6,950,998 B1 * | 9/2005 | Tuan | 716/2 |
| 2001/0048319 A1 | 12/2001 | Miyazaki et al. | |
| 2002/0069396 A1 * | 6/2002 | Bhattacharya et al. | 716/7 |
| 2003/0233628 A1 * | 12/2003 | Rana et al. | 716/18 |
| 2004/0174187 A1 * | 9/2004 | New | 326/41 |
| 2004/0225970 A1 * | 11/2004 | Oktem | 716/1 |
| 2004/0230924 A1 * | 11/2004 | Williams et al. | 716/2 |

* cited by examiner

METHOD AND APPARATUS FOR POWER OPTIMIZATION DURING AN INTEGRATED CIRCUIT DESIGN PROCESS

FIELD OF THE INVENTION

One or more aspects of the present invention relate generally to computer-aided design of electronic circuits and, more particularly, to power optimization during an integrated circuit design process.

BACKGROUND OF THE INVENTION

Power consumption has become an important design challenge in modern integrated circuit (IC) devices, for example, programmable logic devices (PLDs) and standard cell application specific integrated circuits (ASICs). PLDs exist as a well-known type of IC that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBs) surrounded by a ring of programmable input/output blocks (IOBs). The CLBs and IOBs are interconnected by a programmable interconnect structure (routing resources). The CLBs, IOBs, and interconnect structure are typically programmed by loading a stream of configuration data (bitstream) into internal configuration memory cells that define how the CLBs, IOBs, and interconnect structure are configured. The configuration bitstream may be read from an external memory, conventionally an external integrated circuit memory EEPROM, EPROM, PROM, and the like, though other types of memory may be used. The collective states of the individual memory cells then determine the function of the FPGA.

FIG. 1 is a flow diagram depicting a conventional design process ("CAD process 100") for an integrated circuit, such as an ASIC or an FPGA. CAD process 100 begins by receiving a design 101. Design 101 represents a circuit design at a schematic or logic level. At step 102, design 101 is synthesized to produce a logical network list ("netlist") supported by the target device. At step 103, the synthesized design is mapped onto primitive components within the target device (e.g., programmable logic blocks of an FPGA). At step 104, placement for the components of the synthesized and mapped design is determined for the target device. At step 105, interconnects (e.g., signal conductors) are routed within the target device for the placed components. CAD process 100 ends by producing a CAD result 106. Steps 101 through 105 are referred to herein as standard map-place-route (SMPR) process 110.

Performance and frequency requirements translate to a maximum allowable delay for paths traversing routing resources between circuit elements. As such, the conventional design process is "timing-driven" in that SMPR process 110 is optimized in accordance with timing constraints. SMPR process 110, however, does not optimize design 101 for power. Typically, incorporating power optimization in the conventional design process adversely affects the timing performance of the design.

Accordingly, there exists a need in the art for an integrated circuit design process that optimizes power without adversely affecting the timing performance of the design.

SUMMARY OF THE INVENTION

An aspect of the invention relates to designing an integrated circuit having a plurality of logic paths. The integrated circuit is designed in accordance with timing constraint data. Any logic paths in the plurality of logic paths that have a timing characteristic within a threshold are identified and define a first set of logic paths. Any logic paths in the plurality of logic paths other than those in the first set of logic paths define a second set of logic paths. The integrated circuit is then selectively optimized to reduce power consumption in response to the first set of logic paths and the second set of logic paths.

Another aspect of the invention relates to designing an integrated circuit. The integrated circuit is first designed in accordance with timing constraint data. Timing critical logic circuitry is then identified. For example, the timing critical logic circuitry may be defined with respect to timing constraint data. The integrated circuit is then selectively optimized in response to the timing critical circuitry. In an embodiment, logic circuitry other than said timing critical circuitry is power optimized. In another embodiment, the integrated circuit is power optimized and a determination is made as to whether a timing characteristic of the timing critical circuitry has been modified beyond a threshold.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Method and apparatus for power optimization during an integrated circuit design process is described. One or more aspects in accordance with the invention are, described in terms of a field programmable gate array (FPGA). While specific reference is made to an FPGA, those skilled in the art will appreciate that one or more aspects of the invention may be used for designing other types of integrated circuits, such as complex programmable logic devices (CPLDs), application specific integrated circuits (ASICs), and the like.

Figure 1:
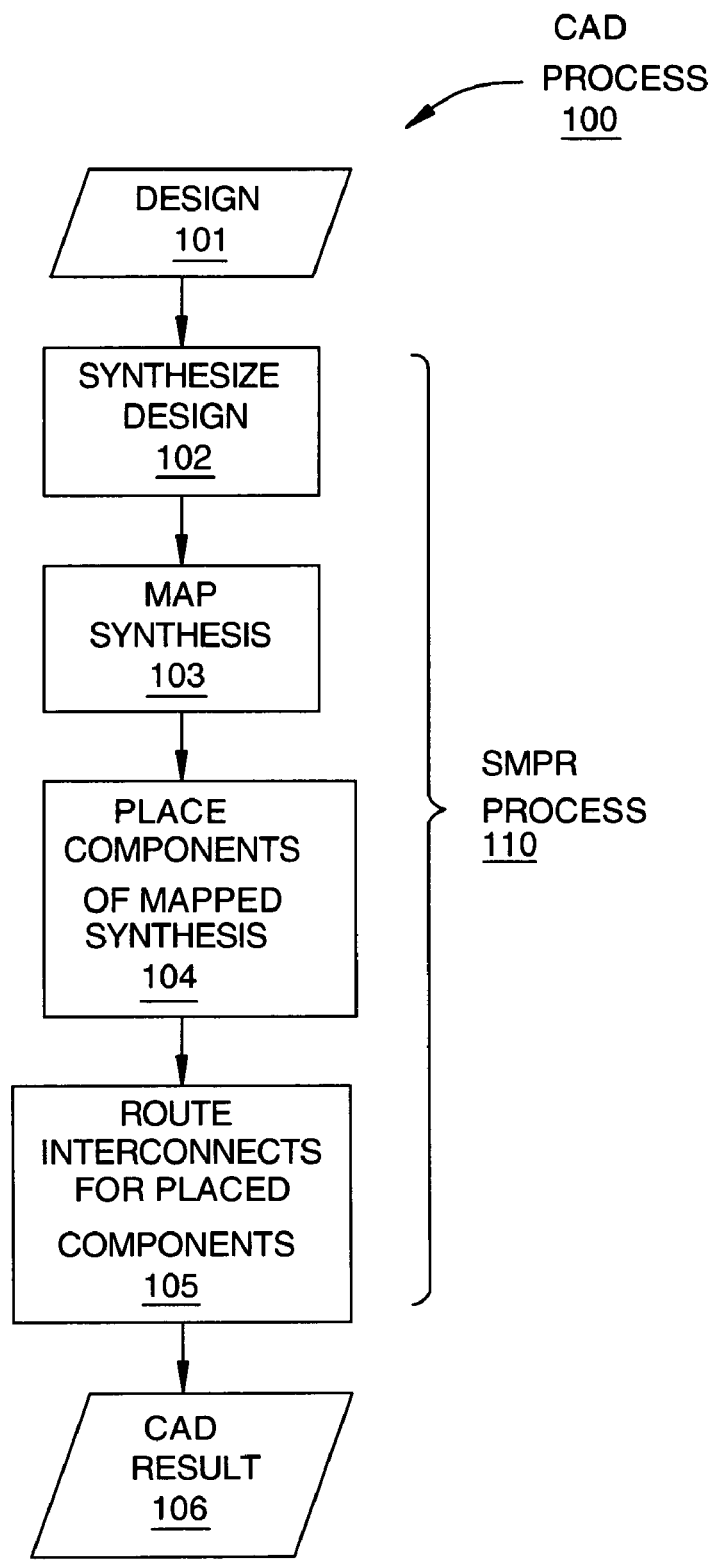
FIG. 1 is a flow diagram depicting a conventional design process for an integrated circuit.
Figure 2:
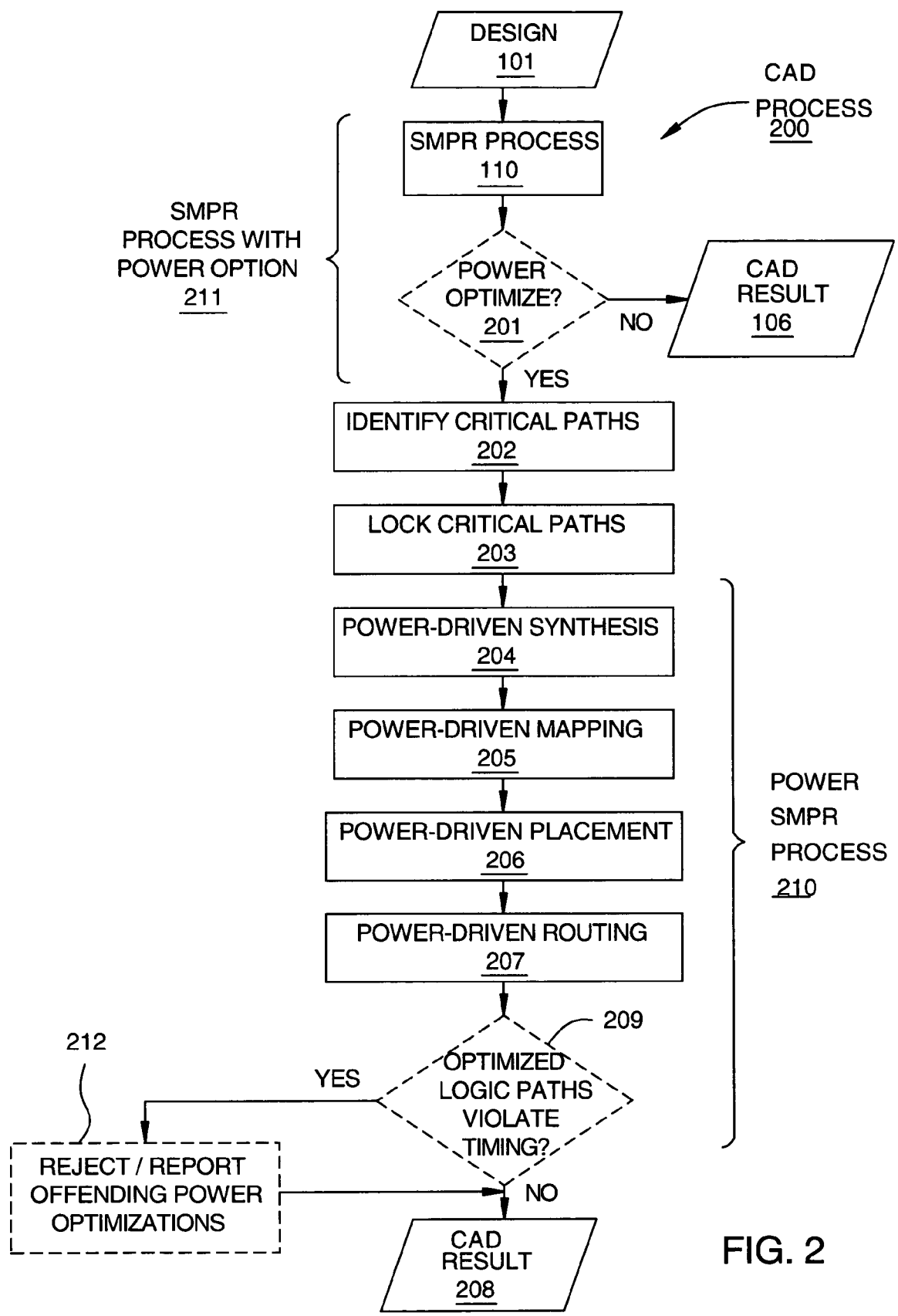
FIG. 2 is a flow diagram depicting an exemplary embodiment of an integrated circuit design process incorporating power optimization.

FIG. 2 is a flow diagram depicting an exemplary embodiment of a CAD process 200 for an integrated-circuit that incorporates power optimization. CAD process 200 receives design 101. CAD process 200 then executes SMPR process 110 described above with respect to FIG. 1. Notably, SMPR process 110 will produce CAD result 106 in accordance with established timing constraint data. Timing constraint data includes a series of constraints applied to logic pathways ("logic paths") within design 101 that dictate the desired performance of the design in the time domain. Logic paths of design 101 include logical circuit configurations and connections or "nets" for connecting logical circuit configurations. For example, a logic path may be a series of logic components having a source and a sink and the signal paths that connect the logic components. In another example, a logic path may be an entire logic subsystem or block of logic circuitry ("logic block") and the connections therein. In this respect, design 101 may include a multiplicity of logic paths. Timing constraints, for example, may include frequency requirements and maximum logic path delay for a particular target device, such as a field programmable gate array (FPGA).

Figure 5:
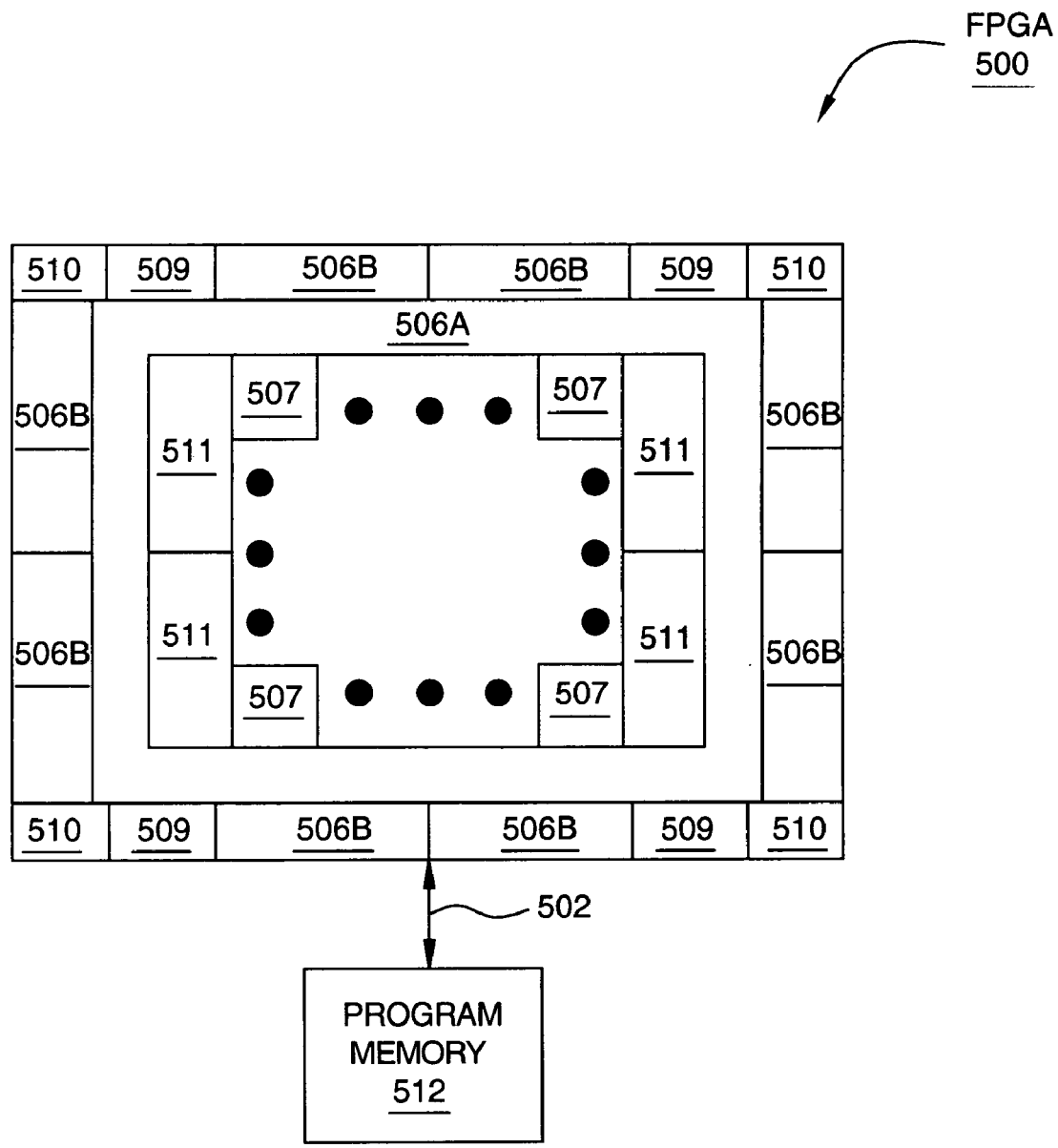
FIG. 5 is a block diagram depicting an exemplary embodiment of a field programmable gate array (FPGA) coupled to a program memory.

Notably, FIG. 5 depicts a block diagram of an exemplary embodiment of an FPGA 500 coupled to a program memory 512. FPGA 500 illustratively includes CLBs 507, I/O routing ring 506A ("programmable interconnect"), memory 511, delay lock loop (DLL) blocks 509, multiply/divide/de-skew clock circuits 510, and programmable IOBs 506B. DLL blocks 509 and clock circuits 510 collectively provide digital clock management (DCM) circuits for managing clock signals within FPGA 500. FPGA 500 may include other types of logic blocks and circuits in addition to those described herein.

CLBs 507 are programmably connectable to each other, and to I/O routing ring 508, for performing various types of logic functions. Each of CLBs 507 may include one or more "slices" and programmable interconnect circuitry (not shown). Each CLB slice in turn includes various circuits, such as flip-flops, function generators (e.g., look-up tables (LUTs)), logic gates, memory, and like type well-known circuits.

Programmable IOBs 506B are configured to provide input to, and receive output from, one or more of CLBs 507. Configuration information for CLBs 507, I/O routing ring 506A, and programmable IOBs 506B is stored in memory 511. Briefly stated, a configuration bitstream produced from program memory 512 is coupled to a configuration port 502 of FPGA 500 to implement a desired circuit therein. Each of CLBs 507, I/O routing ring 506A, and programmable IOBs 506B are generally referred to herein as "programmable logic blocks".

With renewed reference to FIG. 2, as described above, SMPR process 110 does not optimize design 101 for power. That is, SMPR process 110 does not attempt to reduce power consumption during the synthesis, map, place, and routing-processes. At step 201, a determination is made as to whether power is to be optimized. If not, CAD process 200 outputs CAD result 106. If so, CAD process 200 proceeds to step 202. Steps 110 and 201 are referred to herein as SMPR process with power option 211. For users who are not concerned with power consumption, SMPR process with power option 211 allows the power optimization to be skipped such that the run-time of CAD process 200 is not increased.

At step 202, critical logic paths in design 101 are identified. A "critical logic path" is a logic path within design 101 that has a timing characteristic that falls within a particular threshold. The threshold may be pre-defined or may be determined by the user. In an embodiment, the threshold is defined as a certain percentage of the timing constraint data used with SMPR process 110. For example, the timing constraint data may include a maximum logic path delay. Thus, a critical logic path may be a logic path exhibiting a delay that falls within a pre-defined or user-selectable percentage of the maximum logic path delay. The difference between the maximum logic path delay and the delay actually exhibited by a logic path is referred to as "timing slack". Thus, in one embodiment of the invention, logic paths having timing slack with less than x % of the maximum path delay are identified at step 202 as being critical logic paths. The parameter, x, may be a pre-de fined value or may be established by the user. For example, the value of x % may be 10%, such that if the maximum path delay is 20 ns, then all logic paths with a delay of greater than 18 ns are deemed critical logic paths.

In another embodiment, the threshold may be defined in terms of an absolute delay value. For example, the timing constraint data may include a minimum logic path delay. Thus, the critical logic paths may comprise all logic paths that are less than, a predetermined number, e.g., 5 ns slower than the minimum path delay. Those skilled in the art will appreciate that various types of absolute and relative thresholds may be used to determine critical logic paths (also referred to as timing critical logic circuitry).

The critical logic paths identified in step 202 are locked at step 203. That is, the critical logic paths will not be optimized for power. At step 204, design 101 is synthesized to produce a netlist supported by the target device while attempting to reduce power consumption ("power-driven synthesis"). Power-driven synthesis may be performed in accordance with power constraints entered by the user, or may attempt to save the most power possible. For example, power reduction may be achieved using finite state machine (FSM) synthesis (e.g., state encoding, partitioning), arithmetic block synthesis (e.g., choice of adder), or by shielding inputs to functional blocks and/or balancing logic trees to reduce signal glitches.

At step 205, the synthesized design is mapped onto primitive components within the target device (e.g., programmable logic blocks) in accordance with the power constraints ("power-driven mapping"). For example, power-driven mapping may focus on maintaining high-activity nets within logic cells, or performing logic replication carefully and sparingly to avoid an increase in power.

At step 206, components of the synthesized and mapped design are placed within the target device ("power-driven placement"). For example, power-driven placement may focus on minimizing the distance of logic blocks whose interconnecting nets have high switching activity.

At step 207, interconnects are routed within the target device for the placed components ("power-driven routing"). For example, power-driven routing may attempt to reduce power consumption by minimizing the lengths of high-fan-out and high-activity nets.

At optional step 209, a determination is made as to whether any of the power optimized logic paths now violate the timing constraint data. If so, CAD process 200 proceeds to optional step 212, where the offending power optimized logic paths are rejected and/or reported to the user. CAD process 200 ends by producing a CAD result 208. Steps 204, 205, 206, 207, and optional steps 209 and 212 are referred to herein as power SMPR process 210. The critical logic paths that were locked in step 203 are not optimized for power during power SMPR process 210. While specific processes for reducing power consumption during the synthesis, map, place, and route phases were described above, those skilled in the art will appreciate that various other power-saving processes may be employed that are known in the art.

Figure 3:
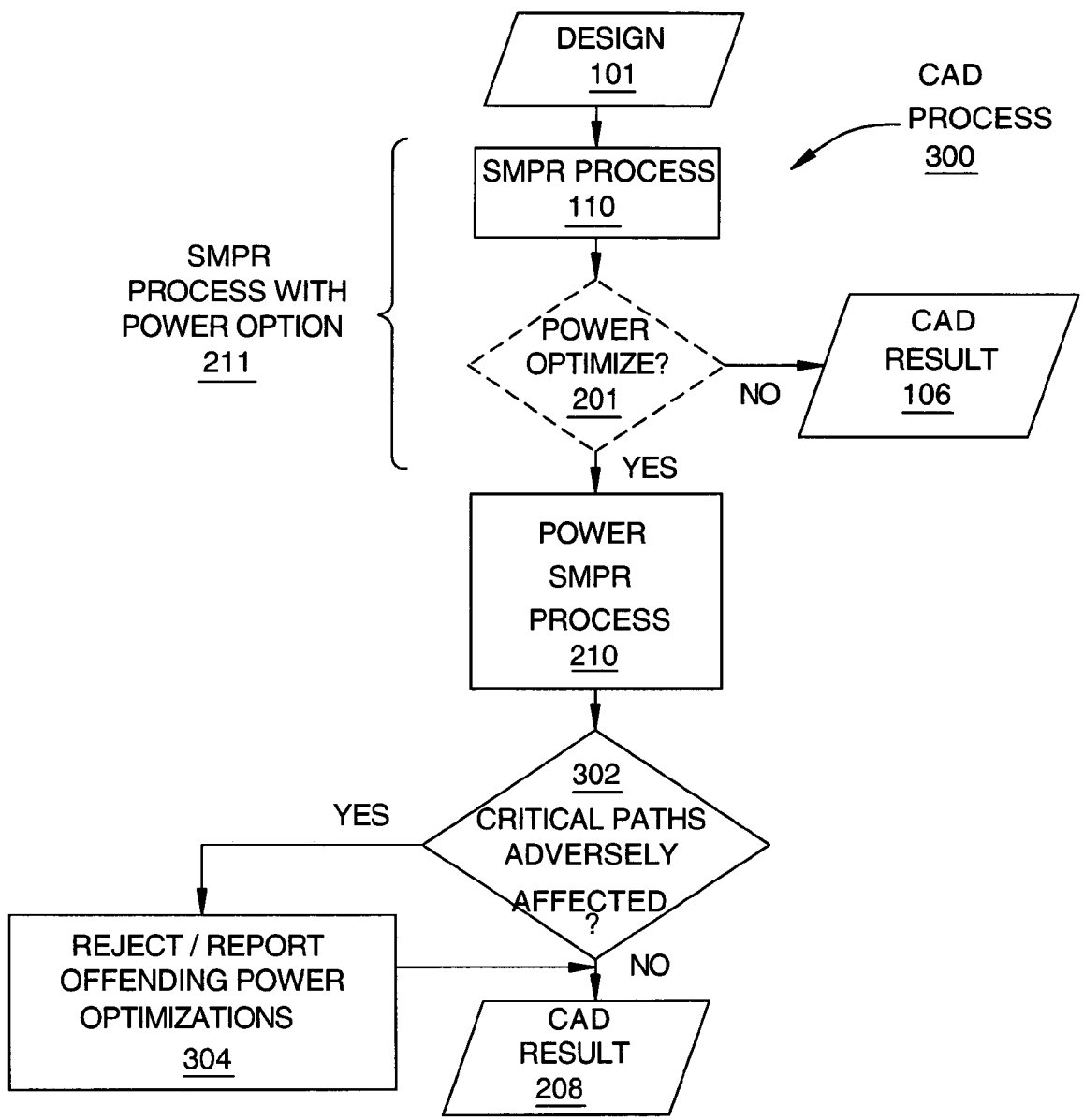
FIG. 3 is a flow diagram depicting another exemplary embodiment of an integrated circuit design process incorporating power optimization.

FIG. 3 is a flow diagram depicting another exemplary embodiment of a CAD process 300 for an integrated circuit that incorporates power optimization. Steps that are the same or similar to those shown in FIG. 2 are designated with identical reference numerals and are described in detail above. In the present embodiment, process 300 proceeds from SMPR process with power option 211 to step 203 without identifying or locking the critical logic paths. Process 300 then executes the SMPR process 201, and proceeds to step 302. At step 302, a determination is made as to whether a power optimization for any of the critical logic paths has adversely affected the timing characteristic beyond a pre-defined or user selectable threshold. If so, the offending power optimizations for the critical logic paths are rejected or reported to the user at step 304. For example, if for a given critical logic path a power optimization results in the decrease of timing slack beyond a threshold, the power optimization may be rejected or reported to the user. Alternatively, if for a given critical logic path a power optimization results in an increase in delay beyond an absolute delay value, or a delay value relative to the timing constraint data, the power optimization may be rejected or reported to the user.

Figure 4:
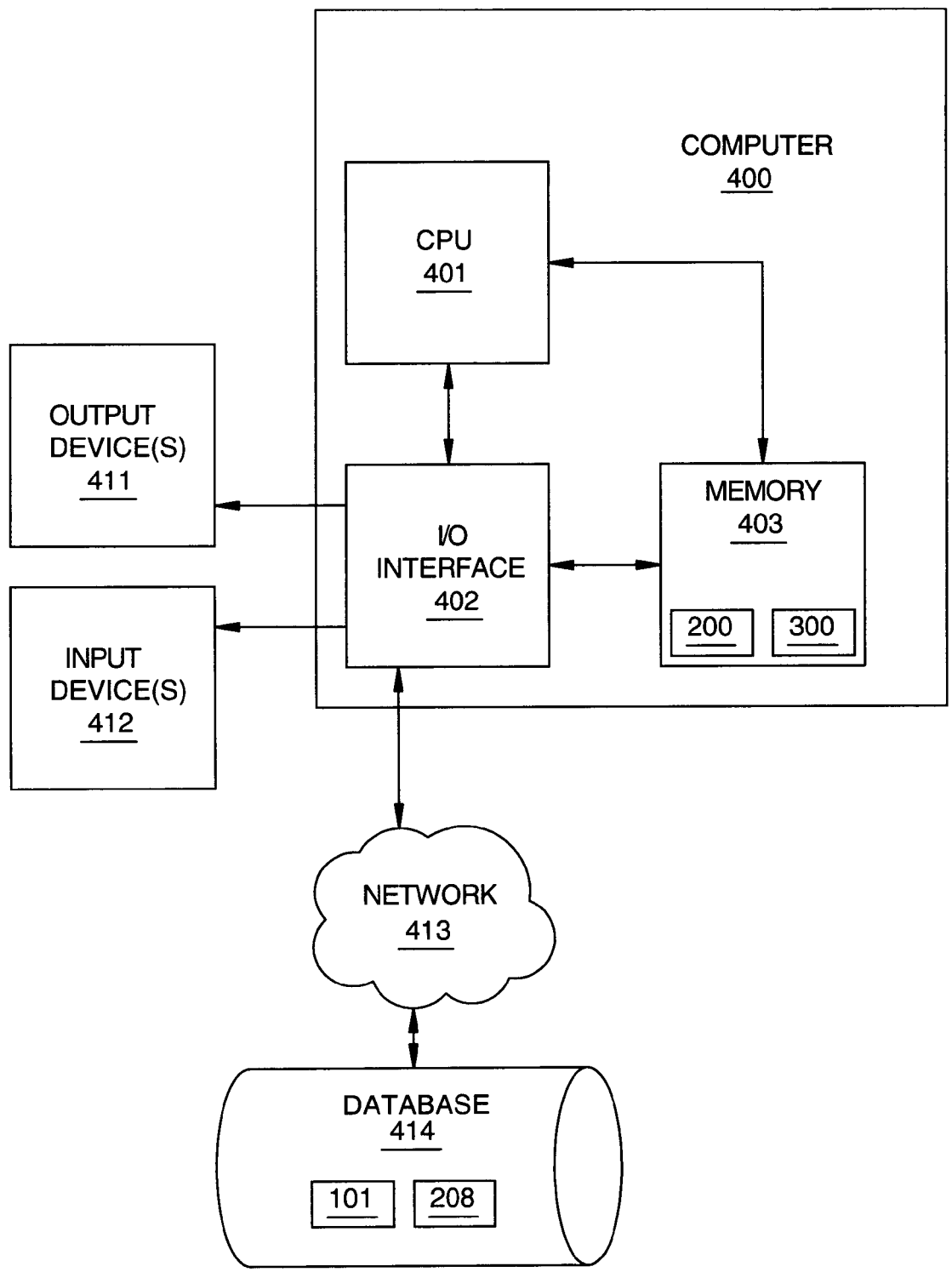
FIG. 4 is a block diagram depicting an exemplary embodiment of a computer system suitable for implementing processes and methods described herein.

FIG. 4 depicts a block diagram showing an exemplary embodiment of a computer 400 suitable for implementing processes and methods described below. Computer 400 includes a central processing unit (CPU) 401, a memory 403, and an I/O interface 402. CPU 401 may be any type of microprocessor known in the art. I/O interface 402 may be directly coupled to memory 403 or coupled through CPU 401. I/O interface 402 may be coupled to various input devices 412 and output devices 411, such as a conventional keyboard, mouse, printer, display, and the like. In addition, I/O interface 402 may be coupled to a network 413 and may be adapted for communication with a database 414 to receive and transmit data, such as data files and the like. Notably, database 414 may store design 101 and CAD result 208, described above with respect to FIG. 2.

Memory 403 may store all or portions of one or more programs and/or data to implement the processes and methods described above. Although the invention is disclosed as being implemented as a computer executing a software program, those skilled in the art will appreciate that the invention may be implemented in hardware, software, or a combination of hardware and software. Such implementations may include a number of processors independently executing various programs and dedicated hardware, such as application specific integrated circuits (ASICs).

Computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in memory 403. Memory 403 may include one or more of the following random access memory, read only memory, magneto-resistive read/write memory, optical read/write memory, cache memory, magnetic read/write memory, and the like, as well as signal-bearing media as described below. Memory 403 may store all or a portion of process 200 or process 300, described above with respect to FIGS. 2 and 3.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

Method and apparatus for power optimization during integrated circuit design process has been described. The power optimization design process achieves substantial power reduction when compared with the conventional design process. The power optimization design process maintains the timing performance of the design's critical signal paths, while optimizing the power consumption of the non-critical signal paths.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. A method of designing an integrated circuit having a plurality of logic paths, comprising:
    designing the integrated circuit in accordance with timing constraint data using a timing-driven design process to produce a design result optimized for timing performance and not for power consumption;
    identifying any logic paths in said plurality of logic paths that have a timing characteristic within a threshold to define a first set of logic paths, where any logic paths in said plurality of logic paths other than said first set of logic paths define a second set of logic paths; and
    selectively performing synthesis, mapping, placing, and routing of the integrated circuit to reduce power consumption in response to said first set of logic paths and said second set of logic paths.

2. The method of claim 1, wherein said selectively performing comprises:
    synthesizing, mapping, placing, and routing only said second set of logic paths.

3. The method of claim 1, wherein said selectively performing comprises:
    synthesizing, mapping, placing, and routing said first set of logic paths and said second set of logic paths; and
    determining whether said timing characteristic of any logic paths in said first set of logic paths has been modified beyond a threshold to define a third set of logic paths.

4. The method of claim 3, further comprising at least one of:
    rejecting a power optimization for each logic path in said third set of logic paths; and
    reporting a timing constraint violation for each logic path in said third set of logic paths.

5. The method of claim 1, further comprising:
    identifying logic paths in at least one of said first set of logic paths and said second set of logic paths that violate said timing constraint data to define a third set of logic paths.

6. The method of claim 5, further comprising at least one of:
rejecting a power optimization for each logic path in said third set of logic paths; and
reporting a timing constraint violation for each logic path in said third set of logic paths.

7. The method of claim 1, wherein said threshold is defined by a percentage of a parameter in said timing constraint data.

8. The method of claim 1, wherein said threshold is defined by an absolute value with respect to a parameter of said timing constraint data.

9. A computer readable medium having stored thereon instructions that, when executed by a processor, cause the processor to perform a method of designing an integrated circuit having a plurality of logic paths, comprising:
designing the integrated circuit in accordance with timing constraint data using a timing-driven design process to produce a design result optimized for timing performance and not for power consumption;
identifying any logic paths in said plurality of logic paths that have a timing characteristic within a threshold to define a first set of logic paths, where any logic paths in said plurality of logic paths other than said first set of logic paths define a second set of logic paths; and
selectively performing synthesis, mapping, placing, and routing of the integrated circuit to reduce power consumption in response to said first set of logic paths and said second set of logic paths.

10. The computer readable medium of claim 9, wherein said selectively performing comprises:
synthesizing, mapping, placing, and routing only said second set of logic paths.

11. The computer readable medium of claim 9, wherein said selectively performing comprises:
synthesizing, mapping, placing, and routing said first set of logic paths and said second set of logic paths;
determining whether said timing characteristic of any logic paths in said first set of logic paths has been modified beyond a threshold to define a third set of logic paths; and
at least one of:
rejecting a power optimization for each logic path in said third set of logic paths; and
reporting a timing constraint violation for each logic path in said third set of logic paths.

12. An apparatus for designing an integrated circuit having a plurality of logic paths, comprising:
means for designing the integrated circuit in accordance with timing constraint data using a timing-driven design process to produce a design result optimized for timing performance and not for power consumption;
means for identifying any logic paths in said plurality of logic paths that have a timing characteristic within a threshold to define a first set of logic paths, where any logic paths in said plurality of logic paths other than said first set of logic paths define a second set of logic paths; and
means for selectively performing synthesis, mapping, placing, and routing of the integrated circuit to reduce power consumption in response to said first set of logic paths and said second set of logic paths.

13. The apparatus of claim 12, wherein said means for selectively performing comprises means for synthesizing, mapping, placing, and routing only said second set of logic paths.

14. The apparatus of claim 12, wherein said means for selectively performing comprises:
means for synthesizing, mapping, placing, and routing said first set of logic paths and said second set of logic paths;
means for determining whether said timing characteristic of any logic paths in said first set of logic paths has been modified beyond a threshold to define a third set of logic paths; and
at least one of:
means for rejecting a power optimization for each logic path in said third set of logic paths; and
means for reporting a timing constraint violation for each logic path in said third set of logic paths.

15. A method of designing an integrated circuit, comprising:
designing the integrated circuit in accordance with timing constraint data using a timing-driven design process to produce a design result optimized for timing performance and not for power consumption;
identifying timing critical logic circuitry;
selectively performing synthesis, mapping, placing, and routing of the integrated circuit to reduce power consumption in response to said timing critical circuitry.

16. The method of claim 15, wherein said selectively optimizing performing comprises:
synthesizing, mapping, placing, and routing logic circuitry within said integrated circuit other than said timing critical logic circuitry.

17. The method of claim 15, wherein said selectively performing comprises:
synthesizing, mapping, placing, and routing said integrated circuit;
determining whether a timing characteristic of said timing critical circuitry has been modified beyond a threshold; and
responsive to said timing characteristic being modified beyond a threshold, at least one of:
rejecting a power optimization of said timing critical circuitry; and
reporting a timing violation.

18. The method of claim 15, wherein said timing critical circuitry is defined with respect to at least one timing constraint parameter.

* * * * *